United States Patent [19]

Iwata et al.

[11] 4,330,494
[45] May 18, 1982

[54] REINFORCED FOAMED RESIN STRUCTURAL MATERIAL AND PROCESS FOR MANUFACTURING THE SAME

[75] Inventors: Akira Iwata, Shiga; Shizunobu Fukushima, Takatsuki, both of Japan

[73] Assignee: Sekisui Kagaku Kogyo Kabushiki Kaisha, Osaka, Japan

[21] Appl. No.: 74,458

[22] Filed: Sep. 11, 1979

[30] Foreign Application Priority Data

| Sep. 13, 1978 | [JP] | Japan | 53/126908[U] |
| Sep. 14, 1978 | [JP] | Japan | 53/112984 |
| Oct. 18, 1978 | [JP] | Japan | 53/142891[U] |
| Oct. 20, 1978 | [JP] | Japan | 53/129696 |

[51] Int. Cl.³ .................................................. B32B 3/12
[52] U.S. Cl. ................................... 264/46.2; 264/45.3; 264/46.5; 264/46.7; 264/257; 156/79; 428/117
[58] Field of Search ........................... 156/78–79; 428/117; 264/45.3, 46.2–46.4, 46.5–46.7, 257

[56] References Cited

U.S. PATENT DOCUMENTS

| 2,744,042 | 5/1956 | Pace | 156/79 X |
| 3,249,659 | 5/1966 | Voelker | 156/79 X |
| 3,317,074 | 5/1967 | Barker, Jr. et al. | 428/117 X |
| 3,394,046 | 7/1968 | Smock et al. | 428/293 |
| 3,526,556 | 9/1970 | Berner | 156/78 X |
| 3,564,085 | 2/1971 | Schickedanz | 264/46.2 X |
| 3,578,526 | 5/1971 | Harding | 428/117 X |
| 3,630,813 | 12/1971 | Allen | 428/117 X |
| 3,917,774 | 11/1975 | Sagane et al. | 264/46.2 |
| 3,951,717 | 4/1976 | Herweg et al. | 156/79 |
| 4,025,257 | 5/1977 | Sagane et al. | 425/115 |
| 4,036,923 | 7/1977 | Saidla | 428/71 X |

FOREIGN PATENT DOCUMENTS

| 51-107360 | 9/1976 | Japan . |
| 1411517 | 10/1975 | United Kingdom | 264/45.8 |

Primary Examiner—Henry F. Epstein
Attorney, Agent, or Firm—Sughrue, Mion, Zinn, Macpeak and Seas

[57] ABSTRACT

A structural material formed of a fiber and honeycomb reinforced foamed resin is disclosed, which is constructed by arranging a honeycomb material, the voids of which contain a foamable thermosetting resinous liquid, between two fibrous layers and heating the assembly to foam the resinous liquid and simultaneously cover and impregnate the fibrous layers whereby the fibrous layers and the honeycomb material are completely impregnated with and encased in the foamed resin.

11 Claims, 7 Drawing Figures

REINFORCED FOAMED RESIN STRUCTURAL MATERIAL AND PROCESS FOR MANUFACTURING THE SAME

BACKGROUND OF THE INVENTION

1. Field of the Invention

The present invention relates to a lightweight structural material of a reinforced, foamed resin, and to a process for preparing the same. More particularly, the present invention relates to a structural material constructed of two surface layers each of which comprises fiber reinforced foamed resin, and a core layer provided therebetween which combines or merges with the surface layers to form a single body, and to a process for preparing such an article.

2. Description of the Prior Art

Hitherto, various shaped articles of foamed resins have been proposed. For instance, there have been known foamed resins reinforced by covering the surface thereof with asbestos slates or metal plates, or by dispersing fibers thereinto. However, when asbestos slates are employed, the articles are weak in impact strength and exhibit poor workability, for example, when they are cut with a saw. On the other hand, in the case of metal plates the articles also have poor workability. In addition, a sufficiently lightweight cannot be attained in either case. When the surface of a foamed resin is covered with a synthetic resin plate reinforced with fibers, the impact resistance of the article is not sufficiently high because of the rigid surface. Further, satisfactorily high compression strength and good workability also cannot be attained.

In addition to the above-described foamed resin materials, plate-like shaped articles having a sandwich construction are known in which for example fiber reinforced resin plates (abbreviated as FRP) are used as a surface material and honeycomb materials are used as a core material. These articles show poor workability on sawing, planing and nail-driving because of the rigidness of the FRP employed as a surface material. It is difficult to render these articles lightweight because, while the core materials contained therein are lightweight, the combined use of the FRP increases their respective specific gravities. These articles are also weak in impact strength. Articles utilizing foamed resins as core materials suffer from the defect that they are easily deformed by compressive stress, and the articles suffer from the defect that they are weak to certain stresses, especially bending stress because the junction between the surface material and the core material is small.

On the other hand, foamed resins reinforced by dispersing fibers therein are excellent in impact resistance, workability and bending and compression strength. One example of a foamed resin fiber reinforced material is described in U.S. Pat. No. 4,025,257 and Japanese patent application (OPI) No. 107360/76 (The term "OPI" as used herein refers to a "published unexamined Japanese patent application"). However, as the foaming magnification increases, the foams communicate with one another at the interfaces of the resin foams with fibers contained therein and water absorption tends to occur. Consequently, an increase in weight and a decrease in heat insulating ability due to water absorption tend to take place and a problem arises. Though it is necessary to limit the foaming magnification to a low level under these circumstances, low magnification is undesirable from the standpoint of providing lightweight and economical articles.

U.S. Pat. No. 3,917,774 discloses a continuous process and apparatus for preparing an elongated foamed resin article reinforced by continuous fibers in which continuous fibers are advanced in parallel relationship in a sheet-like form and are impregnated with a liquid composition capable of forming a foamed thermoset resin. The impregnated fibers are then passed through a gathering means which gathers the fibers into a bundle having a cross-section approximating that of the desired article thereby uniformly dispersing the liquid composition in the fibers. The bundle of fibers is then advanced through a movable molding passage of three or more endless belts arranged parallel to each other so as to form a passageway which has a cross-section perpendicular to the direction of advancement of the bundle of fibers corresponding to the desired cross-section of the article. The belts contact and move with the impregnated bundle of fibers.

SUMMARY OF THE INVENTION

In view of the foregoing one object of the present invention is to provide a structural material which is not only lightweight but also excellent in various properties required for a construction material, such as impact resistance, compression strength, bending strength, heat insulating ability, waterproof, reagent proof, workability, etc.

It is another object of the present invention to provide a process for preparing such a material with ease and with high efficiency.

Another object of the present invention is to provide a reinforced foamed resin structural material which is excellent in bending strength notwithstanding its relatively small fiber content, and to provide a process for preparing the same.

It has now been found that the above-described objects are attained by a lightweight reinforced foamed resin structural material comprising two surface layers constructed of foamed resin reinforced by fibers and a core layer provided therebetween wherein the layers are combined into a single body and the core layer is constructed of a material having a honeycomb structure the voids of which are charged with a foamed resin.

Further, the objects of the present invention are more effectively attained by a lightweight reinforced foamed resin structural material as described above in which the respective surface layers are constructed of a foamed layer reinforced by a highly impregnatable fiber mat and a foamed layer, which is laminated thereto on the surface facing the core layer, reinforced by a multiplicity of long fibers spread and arranged in a specific direction.

DETAILED DESCRIPTION OF THE INVENTION

Figure 1:
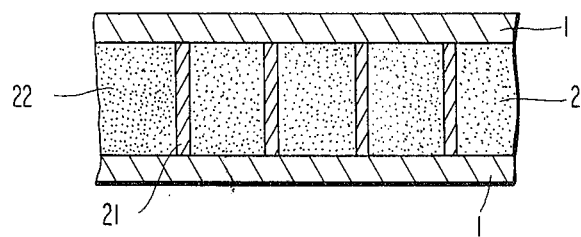
FIG. 1 is a cross-section of one embodiment of the reinforced foamed resin structural material of the present invention comprising surface layers 1 and a core layer 2.

The foamed resin materials of the present invention have a variety of applications and can be used in particular for heat insulation, for walls of houses, for floors, benches and verandas, for loading stands of autotrucks, for land and marine containers, core materials for FRP ships, etc.

Reinforced foamed resin structural materials of the present invention are described below and illustrated in detail in the drawings.

FIG. 1 is a cross-section of one embodiment of the material of the present invention, in which core layer 2 is provided between surface layers 1 so as to form a single body together with the two surface layers. The surface layer 1 is constructed of a foamed resin reinforced by fibers, and the core layer 2 is made of a honeycomb material 21 in which a foamed resin 22 charges the voids of the honeycomb material 21.

Figure 2:
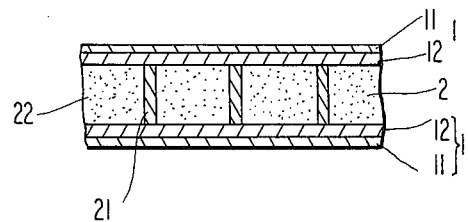
FIG. 2 is a cross-section of another embodiment of the material of the present invention, wherein the surface layer 1 has a dual layer structure of a foamed layer 11 reinforced by a fiber mat and a foamed layer 12 reinforced by a multiplicity of long fibers spread and arranged in a specific direction.

FIG. 2 is a cross-section of another embodiment of the material of the present invention, in which the surface layer 1 has a dual layer structure constructed by the foamed layer 11 which is reinforced by a fiber mat, and the foamed layer 12 which is reinforced by a multiplicity of long fibers. In addition, the fiber mat reinforced foamed layers 11 are arranged so as to become the outermost layers of the material respectively.

Figure 3:
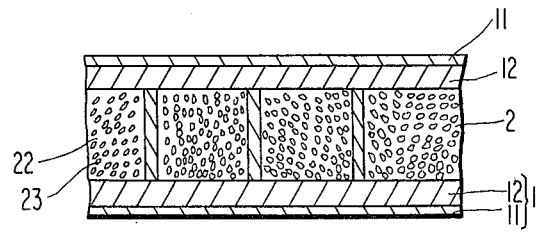
FIG. 3 is a cross-section of still another embodiment of the material of the present invention, in which an aggregate 23 is present in the foamed resin 22 charging the voids of the honeycomb material 21.

FIG. 3 is a cross-section of a further embodiment of the structural material of the present invention, wherein an aggregate 23 is present in the resin charging the voids of the honeycomb.

Specific examples of fibers which constitute the surface layers of the present invention and function as reinforcing materials include highly impregnatable materials made of glass fibers, natural fibers, synthetic fibers, metallic fibers, carbon fibers and so on. These fibers may be employed in the form of short fibers 5 mm to 10 cm in length, long fibers more than 10 cm in length, a woven fabric such as a glass cloth or a woven net of fibers, a layer in which the fibers are arranged in planar parallel relationship, a nonwoven mat of fibers such as a chop-strand mat, a continuous strand mat, glass-paper, surface mat, etc. A nonwoven glass-paper, and surface mat are reinforcing materials which are made of 2 to 10 cm single fibers. The former is produced by a so-called wet process using an emulsion binder such as a polyvinyl acetate emulsion and a polyacrylate emulsion. The latter is produced by a so-called dry process without the use of an emulsion binder, using a hot-melt process. Of these fibers, glass fibers are the most preferred from the standpoint of the strength and the price of the article obtained. Preferably the fibers are employed in the mat form.

Preferable fibers have such a high capacity to be impregnated with various liquids that the fibers can be spread in a layer and impregnated with foamable thermosetting resinous liquids with high permeabilities, and such that a liquid resinous material can penetrate into the inner fiber layer by merely sprinkling it over the surface of the fiber layer and further can pervade the fiber layer upon expansion resulting from foaming of the resinous liquid. Thus, foamed resins reinforced by fibers wherein the fibers are completely and uniformly dispersed in the foamed resin can be easily obtained when highly impregnatable fibers as described above are employed and foamable thermosetting resinous liquids are supplied to the fibers by a simple sprinkling treatment or the like followed by foaming and setting of the resinous liquids. In this manner special apparatuses for impregnation of resinous liquids are not necessary.

The porosity of such highly impregnatable fibrous materials range from about 50 to 97 volume % voids, preferably from about 80 to 95 volume % voids. A glass cloth typically has about 90 volume % voids. As a specific example of the most preferable highly impregnatable fibrous material, mention may be made of a continuous strand mat as described in U.S. Pat. No. 3,394,046. This mat is prepared by laminating a multiplicity of continuous long glass fibers in one or more layers as the fibers are revolved in a vortex and then combining fibers in superposed areas utilizing adhesives previously adhered to the fibers to shape a mat. The continuous strand mat has a far higher capacity (compared with the cases of chop strand mat and glass cloth) to be penetrated and impregnated with a resinous liquid, and exhibits better fiber dispersibility into a foamed resin at the time of foaming and setting of the resinous liquid. Typically a mat of this type will contain about 85 volume % voids depending on how densely the fibers are laminated.

The foamed resins constituting the surface layers 1 and the foamed resin 22 employed for the core layer 2 may be the same or different. Two or more fiber layers can also be placed one on top of the other and laminated on each side of a honeycomb material as a surface layer. Generally the amount of fibrous material in the surface layers range from 10 to 70 volume % and preferably from 15 to 60 volume %.

The foamed synthetic resins employed in the surface layers and core layer are not particularly limited. However, from the standpoints of the heat resistance required of a construction material and facility in preparation of a plate-like shaped article thermosetting resins such as polyurethanes, phenolic resins, unsaturated polyester resins, urea resins, melamine resins, epoxy resins, etc., are preferred. Of these thermosetting resins, foamable thermosetting resinous liquids which can be foamed and set in a short period of time are particularly suitable for use in the present invention.

Representative examples of polyester resins are esters obtained from the reaction between a dibasic acid such as a maleic acid, fumaric acid, etc., and a dihydric alcohol, such as ethylene glycol, diethylene glycol, etc. As urea resins, condensation products of ureas and aldehydes may be used and as epoxy resins, reaction products of epichlorohydrins and bis(4-hydroxyphenol)-dimethylmethane may be used.

A particularly effective process for preparing the structural materials of the present invention is performed using a resinous liquid of foamable polyurethane, which provides a rigid polyurethane foam. Such a foamable liquid contains a foaming agent, a catalyst and a foam controlling agent mixed together with a polyol and a polyisocyanate. As a polyol, both polyester polyols and polyether polyols may be used. Polyester polyols such as obtained from a condensation reaction between a dicarboxylic acid, such as adipic acid, suberic acid, sebacic acid, phthalic acid, isophthalic acid, terephthalic acid, etc., and a polyhydric alcohol such as ethylene glycol, 1,2-propylene glycol, 1,3-butylene glycol, 2,3-butylene glycol, dimethylene glycol, pentamethylene glycol, hexamethylene glycol, decamethylene glycol, trimethylolpropane, trimethylolethane, glycerin, etc., may be used. Polyether polyols such as obtained from an addition polymerization between a polyhydric alcohol such as glycerin, trimethylolpropane, pentaerythritol, α-methyl glucose, sorbitol, sucrose, etc., and an alkylene oxide such as an ethylene oxide, a 1,2-propylene oxide, a 1,2-butylene oxide, a 2,3-butylene oxide can also form the resin. Examples of the isocyanate are a tetramethylene diisocyanate, a hexamethylene diisocyanate, an ethylene diisocyanate, a xylene diisocyanate, a 1,3,6-hexanetriisocyanate, a phenylene diisocyanate, a tolylene diisocyanate, a chlorophenylene diisocyanate, a diphenylmethane diisocyanate, a triphenylmethane-4,4′,4″-triisocyanate, a xylene-α,α′-diisocyanate, an isopropylbenzene-1,4-diisocyanate, etc.

As a foaming agent, water or a volatile liquid having a low boiling point such as a monofluoro-trichloromethane, dichloro-difluoromethane, dichloro-tetrafluoroethane, monochloro-difluoromethane, etc., may be used and to control foaming water-soluble silicone compounds or polysiloxaneoxyalkylene copolymers are used. A basic salt of a metal of Group VIII of the Periodic Table, a tertiary amine and tin compound, etc., are generally used as catalysts.

Of these resinous liquids those providing a rigid polyurethane are especially preferred.

Any honeycomb material is suitable as the core material of the present invention as long as it has a planar shape. The honeycomb material is not limited in terms of the shape of the honeycomb structure. A cell of the honeycomb material is, for example, about 5 mm to 50 mm, preferably about 8 to 20 mm across but will depend on the size and shape of the structural material formed. The materials may have a variety of design constructions such as hexagonal, wave-like, and cylinder-like constructions. Specific examples of honeycomb materials suitably employed in the present invention include conventional honeycomb core materials conventionally used for preparing articles having sandwich structures such as paper honeycombs, paper honeycombs impregnated with resins such as thermosetting resins, for example, polyurethanes, phenol resins, unsaturated polyester resins, epoxy resins, melamine resins, urea resins, etc., and thermoplastic resin emulsions or solutions, for example, polystyrene, polyvinylacetate, polyacrylate, etc.; plastic honeycombs, metal honeycombs and so on. The thickness of the honeycomb structure ranges from 5 mm to 99 mm. The thickness of the material sheet constructing the honeycomb core ranges from about 0.1 to 2 mm, preferably 0.2 to 1 mm.

In addition, in the present invention aggregates may be incorporated in the foamed resin 22 charging the voids of the honeycomb material 21 as illustrated in FIG. 3. Specific examples of such aggregates include inorganic fillers such as calcium carbonate, talc, aluminum hydroxide, etc., lightweight aggregates such as silica balloon, perlite, glass balloon, etc., quartz sand, etc. These aggregates are employed to improve various physical properties, for example, the compression strength of a foamed resin constituting the core layer and to reduce the price of the article. The aggregate may be used in an amount corresponding to 5 to 60% by volume calculated based on the volume occupied by the core layer in the lightweight foamed resin material of the present invention.

Foamed resin materials having particularly good bending strength can be obtained by providing as the surface layer a dual layer of a foamed resin reinforced by a highly impregnatable fiber mat, preferably a continuous strand mat, and a foamed layer reinforced by a multiplicity of long fibers, preferably glass fibers, spread and oriented in one or more directions as desired. In the case of the continuous processes illustrated in FIGS. 4 and 5 it is convenient and good mechanical properties can be obtained by orienting the fiber in the running direction of the work. Therein, the extent of the improvement in the bending strength is greater than what should be expected from the amount of fibers used.

The long fibers employed for reinforcement of the foamed layer 12 in the surface layer 1 are spread and arranged in a certain direction and include glass fibers, synthetic fibers, metallic fibers, carbon fibers, etc. When single fibers are used as long fibers, fibers having a thickness of 6μ to 30μ, preferably 9μ to 20μ are spread on the honeycomb material at a rate of 50,000 to 450,000 single fibers per meter. In particular, a glass roving obtained by assembling a multiplicity of glass fibers and then roving them is preferred. Glass rovings are spread on the honeycomb material at a rate of 50 to 300 glass rovings per meter. One glass roving contains from about 1,000 to 15,000 single fibers. The direction in which the long fibers are spread and arranged is generally the lengthwise direction of the shaped article which in a continuous manufacture corresponds to the running direction.

Figure 6:
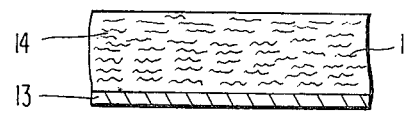
FIGS. 6 and 7 are cross-sections of surface layer constructions adopted in different embodiments of the present invention.
Figure 7:
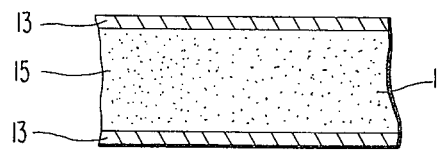

Other embodiments of the surface layer of the present invention are illustrated in FIGS. 6 and 7. In the surface material of FIG. 6, a foamed resin is reinforced by a large number of long fibers 14 dispersed in the foamed resin and further by a fiber mat 13 provided in the vicinity of one of the surfaces of the foamed resin. In the surface layer of FIG. 7 a foamed resin 15 is reinforced by a fiber mat 13 provided in the vicinity of both surfaces of the foamed resin. In the present invention, the surface layer is about 0.5 to 20 mm thick and preferably about 0.6 to 10 mm thick. The thickness for the fiber mat reinforcing the surface layer is about 0.1 to 10 mm and preferably about 0.2 to 7 mm, and the thickness of the long fiber reinforced layer is about 0.1 to 10 mm and preferably about 0.2 to 8 mm. It will be apparent to the skilled artisan, however, that these dimensions may be adjusted depending upon the size and shape of the structural material formed.

Such surface layers can be prepared with ease by, for example, placing first a fiber mat impregnated with a foamable thermosetting resinous liquid in a mold and then arranging thereon fibers impregnated similarly with the resinous liquid with a prescribed thickness, followed by foaming and setting of the resinous liquid in the mold. Another method involves applying a foamable thermosetting resinous liquid between two layers of a fiber mat impregnated with the same resinous liquid, placing them in a mold, and then allowing the resinous liquid to undergo foaming and setting in the mold.

In order to obtain the structural material of the present invention, the surface layers and the core layer may be prepared separately (i.e., impregnated, foamed and set), and they may be stuck to one other with aid of adhesives to form a single body. In this case the adhesives preferably have a composition similar to that of the foam resin. A polyisocyanate adhesive is preferably used. However, it is more desirable to prepare the plate-like shaped article of the present invention in the following manner for simplicity and the core layer can be combined more firmly with the surface layers to form a single body. A honeycomb material is placed between two surface layers to prepare a laminate, a foamable thermosetting resinous liquid is supplied to the laminate, and the resulting resinous liquid is allowed to foam and simultaneously to set to fill the voids of the honeycomb material with the foamed resin and at the same time, to impregnate and cover the fibers constituting the surface layers in the foamed resin produced. Thus, the surface layers and the core layers are combined firmly into a unitary construction.

Figure 4:
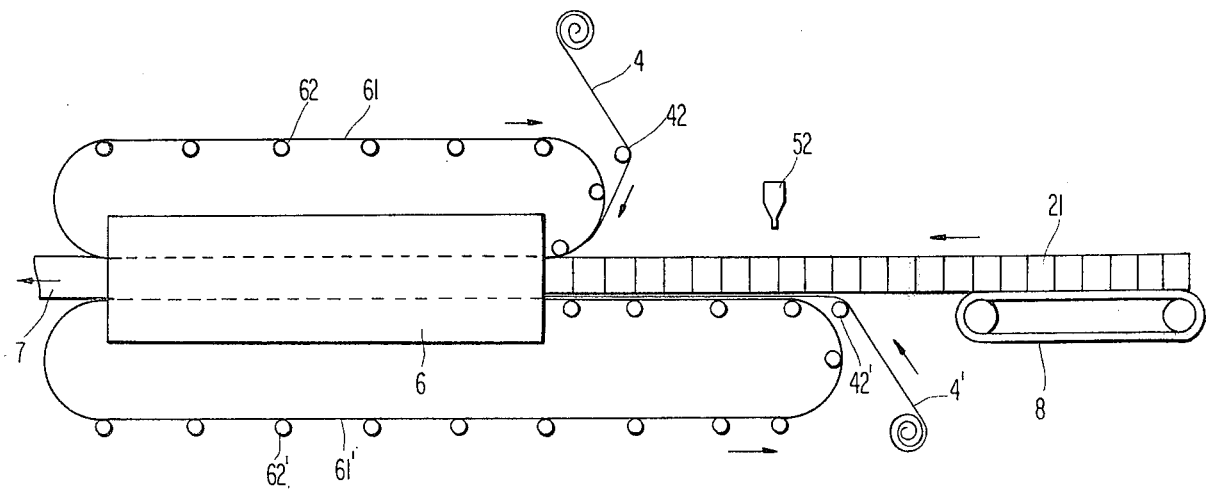
FIG. 4 is an illustration of an embodiment of a process for preparing a reinforced foamed resin structural material of the present invention.

FIG. 4 is an illustration of an embodiment of a process of the present invention wherein two layers of highly impregnatable continuous fibers (e.g., continuous strand mats) 4 and 4' are pulled from their respective reels and are advanced in the direction shown by the arrow in layers by means of guide rolls 42 and 42', respectively. A honeycomb material 21 is also advanced in the direction shown by the arrow and arranged so as to be situated between the above-described two layers of fibers 4 and 4'. In addition, a conveyor 8 supports and transports the honeycomb material. These materials are conveyed and transported to a passage for molding 6 which has a cross section corresponding to the plate-like shape. The passage 6 is constructed of an endless belt 61 corresponding to the upper surface, an endless belt 62 corresponding to the lower surface or floor and, further, one endless belt which covers both sides of the passage not shown in the figure. 62 and 62' are guide rolls for endless belts 61 and 61', respectively. The passage may be constructed of the endless belts alone, but side walls, a ceiling and a floor are preferably further provided to obtain a more uniform foam and a smoother article surface.

The endless belt 61' which forms the floor of the passage 6 is arranged so as to extend beyond the inlet opening of the passage 6 in the direction opposite to the advancing direction of the honeycomb material and provides a location where the honeycomb material is superposed upon the layer of highly impregnatable fibers 4', which forms the lower layer of the article, and they are supported by belt 61' and transported towards the inlet of the passage. A foamable thermosetting resinous liquid is supplied to the honeycomb material 21 by means of a resinous liquid supplying apparatus 52 from an upper position before application of the fibers 4 forming the upper surface layer, and it is retained by the voids of the honeycomb material 21. With the advancement of these materials a layer of the fibers 4 is applied to the upper surface of the honeycomb material 21 and superposed thereon to produce a laminate, followed by the introduction of the laminate into the passage for molding 6. In passage 6 the belts 61, 61' and the side belts contact and move the resin containing laminate.

Thereafter the foamable thermosetting resinous liquid is foamed in the passage for molding 6. Due to expansion occurring as the result of foaming, the voids of the honeycomb structure are filled with the resinous liquid and, at the same time, some portions of the resinous liquid uniformly permeate the fibers 4 and 4'. Further, due to subsequent setting of the resinous liquid the resinous liquid together with the honeycomb material 21 and fibers 4 and 4' are formed into a plate-like shaped article of a foamed resin reinforced by fibers and a honeycomb material. The thus-obtained shaped article is pulled from the passage by a means such as a roller conveyor or endless belt (not shown in the figure) and cut to a definite size.

Passage for molding 6 may be equipped with a heating apparatus to accelerate the foaming and the setting of the resinous liquid, and a cooling apparatus for lowering the temperature after the conclusion of foaming and setting phenomenon, etc.

Passage 6 is usually 2 to 20 meters long and assembled material is in the passage for 1 to 25 minutes. Suitable foaming temperatures are about 0° to 50° C. and preferably 10° to 35° C. Generally foaming is completed in 10 seconds to 5 minutes and preferably 30 seconds to 2 minutes. The setting temperature is usually about 40° to about 150° C. and preferably 60° to 120° C. and can be accomplished in 1 to 20 minutes and preferably 2 to 10 minutes.

Figure 5:
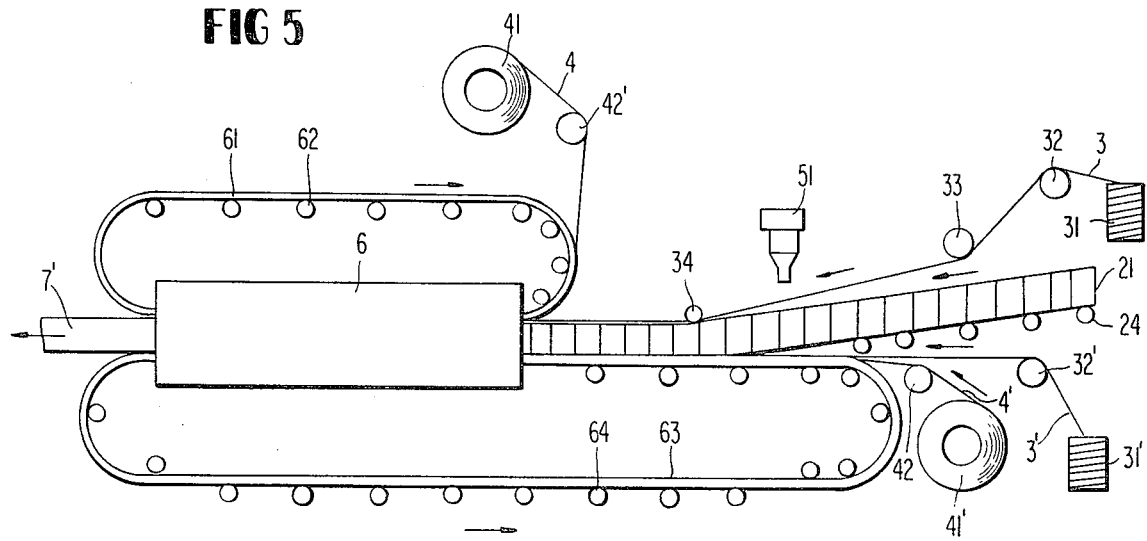
FIG. 5 is an illustration of another embodiment of the process for preparing another structural material of the present invention.

FIG. 5 is an illustration of another embodiment of a process of the present invention wherein an endless belt 61 forms the upper surface of the passage for molding 6, an endless belt 63 forms the lower surface of the passage for molding 6, 62 and 64 are guide rolls for the endless belts 61 and 63, respectively, and a side frame may be arranged along the sides of the lower endless belt 63. Endless belts 61 and 63 travel in the directions indicated by the arrows. In addition, the endless belt 63 which forms the lower surface of the passage 6 is arranged so as to extend beyond the inlet of passage 6 and thereby provide a convenient location for placement of the materials to be molded. Glass rovings 3 and 3' which are a multiplicity of glass fibers are pulled in the advancing direction shown by the arrow from rolls 31 and 31' and via guide rolls 32, 32', 33 and 34 and arranged horizontally in a parallel relationship at regular intervals. In addition, continuous strand mats 4 and 4' are fed from rolls 41 and 41' to passage 6 via guide rolls 42 and 42'.

As described above, the combination of a continuous strand mat and a glass roving is employed as a fiber material layer in the present invention. Therein, the continuous strand mat 4, which is employed for constructing the upper surface layer, and the continuous strand mat 4', which is employed for constructing the lower surface layer, are arranged so as to be situated in the positions corresponding to their respective outermost surfaces. On the other hand, the honeycomb material 21 is continuously supplied from a location elevated from the passage for molding 6, via guide roll 24 and it descends to the surface of the extension of the lower endless belt 63 and with the advancement thereof the angle of descent decreases and the honeycomb material is not fixed in the vicinity of the inlet of the passage for molding 6. It comes into contact with the endless belt 63 in the vicinity of the inlet of the passage and is supported by the endless belt 63. The above-described honeycomb material 21, glass rovings 3 and 3', and continuous strand mats 4 and 4', respectively, are advanced in the directions indicated by arrows, and applied so as to form a single body at the time of introduction into the passage for molding 6. On the way to the passage for molding, namely, where the honeycomb material is elevated from the endless belt 63 and does not come entirely into contact with the belt, a foamable thermosetting resinous liquid is supplied from a foamable liquid-injecting apparatus 51 situated above.

The resinous liquid supplied in the above-described manner passes through the voids of the honeycomb material 21 to fall onto the fiber layer on the endless belt 63 and subsequently permeates into such fiber materials. At the same time, the resinous liquid flows laterally passing into the space between the endless belt 63 and the fiber layer and the honeycomb material 21 to result in the uniform distribution. Furthermore, the resinous liquid gradually flows down the elevated honeycomb material and toward the honeycomb material supported by the endless belt 63 to result in the uniform distribution to individual interstices making up the honeycomb structure of the honeycomb material 21. In the passage for molding, foaming of the foamable thermosetting resinous liquid occurs which is accompanied by expansion. Due to expansion the voids of the honeycomb structure and gaps between the fiber material constituting the lower surface layer are completely filled with the foamed resin and, at the same time, the foamable resinous liquid penetrates into the fiber materials constituting the upper surface layer to encase them in foam. Thereafter, setting of the foamable thermosetting resinous liquid occurs to result in the production of a plate-like shaped article 7' of the foamed resin reinforced by honeycomb material 21, glass rovings 3 and 3', and continuous strand mats 4 and 4'. The thus-obtained material 7' is pulled from the outlet of the passage for molding 6 by a means not shown in the figure and cut into a definite size.

As can be seen from FIG. 4 and FIG. 5, the supply of the resinous liquid may be carried out before or after the application of the fiber material 4 to construct the upper surface layer on the honeycomb material. Such being the case, FIG. 5 shows an embodiment where after the fiber material is applied to the honeycomb material, the resinous liquid is supplied to the honeycomb material through the fiber material 3 from a place situated above the fiber material 3.

A convenient thickness for the structural material of the present invention is from 10 to 100 mm and a specific gravity is 0.2 to 0.8, however, other sizes and specific gravities may be obtained depending upon the end use of the material. Since the lightweight foamed resin material of the present invention has the construction as described above, wherein the surface layer is constructed of a foamed resin reinforced by fiber material(s) while the core layer is a honeycomb material the voids of which are filled with a foamed resin, and these layers are combined into a single body, it is lightweight and excellent in the mechanical properties required of a construction material, for example, compression strength, bending strength and the like, as well as impact resisting peroperty. In particular, due to the surface layer constituted by a foamed resin reinforced by fibers, the shaped article of the present invention can exhibit such effects that not only impacts applied thereto can be absorbed by the foamed resin, but also cracks generated are not propagated. In addition, owing to the presence of the foamed layer reinforced by long fibers pulled and arranged in one or more directions the shaped article of the present invention can demonstrate effectively its strength such as bending strength or the like, notwithstanding the relatively small amount of fibers used. Further, the presence of such a foamed layer serves the purpose of lightening the material. Furthermore, the plate-like shaped foamed resin article of the present invention is not only excellent in heat insulating ability, waterproof and reagent proof but also has good workability. The structural materials of the present invention usually have a planar shape. Accordingly, the materials of the present invention can be employed suitably for construction materials which are required to be light in weight, to possess heat insulating property and further, to possess high compression strength. Specifically, they can exhibit their abilities when they serve as heat insulating materials for walls of houses, floor materials, materials for making benches and verandas, materials for loading stands of autotrucks, materials for land and marine containers, core materials for FRP ships and so on. To facilitate their use in these areas the structural materials may be formed on opposite parallel sides with an interlocking tongue and groove construction.

Moreover, on the occasion that highly impregnatable fiber materials are used in the present invention, the fiber materials need not be impregnated with foamable thermosetting resinous liquid in advance, and it becomes possible to impregnate uniformly the fiber material with the resinous liquid through the expansion resulting from the foaming of the resinous liquid supplied to the honeycomb materials. Therefore, the impregnating process and apparatus for impregnating previously the fiber materials with resinous liquids are rendered unnecessary in the present invention. Thus, in accordance with embodiments of the present invention, foamed resin materials possessing excellent properties as described above can be prepared simply and effectively.

In addition, by adopting a special method of supplying the honeycomb material and the foamable thermosetting resinous liquid in the present invention a structural material can be prepared in which the foamed resin is uniformly contained in individual voids of the honeycomb structure of the honeycomb material.

The present invention will now be illustrated in greater detail by reference to the following examples.

EXAMPLE 1

In a box shaped steel mold having an inside volume 2 cm deep, 10 cm broad and 50 cm long and having two holes having a diameter of 0.5 mm in the upper mold for the purpose of letting generated gas out of the mold, a continuous strand mat (the product of Asahi Fiber Glass Co., Ltd.) 1 mm thick having weight of 450 g/m$^2$ and cut in size of 10 cm by 50 cm was spread and then 200 g of foamable polyurethane was poured onto the mat so as to become evenly dispersed state.

The above-described foamable polyurethane was obtained by mixing 150 parts by weight of crude diphenylmethane diisocyanate with a liquid composition consisting of 100 parts by weight of polyether polyol having 4 hydroxy groups obtained by an addition reaction of propylene oxide, 1.5 parts by weight of distilled water, 5 parts by weight of monofluoro-trichloromethane, 0.5 part by weight of silicone oil and 0.3 part by weight of dibutyl tin dilaurate.

Next, a paper honeycomb (Hatocore, manufactured by Honshu Paper Co., Ltd. having an apparent specific gravity 0.04, a thickness of sheet constructing the honeycomb 0.6 mm) having the thicknes of 18 mm and cut in size of 10 cm by 50 cm was placed on the foamable polyurethane layer and thereon a continuous strand mat of the same kind as described above was additionally placed. Thereafter, the mold was closed.

After the foaming of the resinous liquid in the mold was almost completed, the mold was placed in a heating oven and the foamed resin therein was heated at a temperature of 120° C. for 10 minutes. Thereafter, the mold was removed from the oven, chilled with water and then the resulting molding was removed from the mold.

The thus-obtained article had a planar construction and a specific gravity of 0.28. The surface layer was constructed of the foamed polyurethane reinforced by the continuous strand mat (17.7% by volume) and had a thickness of 1 mm. The core layer was constructed of the paper honeycomb and the foamed polyurethane. In addition, the bending strength and other properties are set forth in Table 1.

EXAMPLE 2

A foamed resin structural material was prepared in the same manner as in Example 1 except that two continuous strand mats 1 mm thick were employed to form both surface layers (4 mats in total), and the quantity of the foamable polyurethane used was 225 g instead of 200 g. The specific gravity of the article obtained was 0.35. Its physical properties are set forth in Table 1.

COMPARISON EXAMPLE 1

Onto a glass roving (weight: 110 g) which was obtained by cutting long glass fibers in length of 50 cm and then, by bundling them, was sprinkled 240 g of the same foamable polyurethane used in Example 1 to result in uniform impregnation of the fiber with the polyurethane. The resulting glass roving was inserted into a tube-form mold having the inside cross section of 10 cm×2 cm and length of 50 cm, and the both ends of which were open. After the conclusion of foaming, the mold was placed in a heating oven, and heated at a temperature of 120° C. for 10 minutes to result in the setting of the foamed resin. After cooling the mold, the resulting molding was removed from the mold.

The thus obtained article corresponded to the plate-like shaped foamed polyurethane reinforced by long glass fibers arranged in the lengthwise direction, and had a specific gravity of 0.35. Its physical properties are also set forth in Table 1.

TABLE 1

| Physical Properties | Example 1 | Example 2 | Comparison 1 |
| --- | --- | --- | --- |
| Specific Gravity | 0.28 | 0.35 | 0.35 |
| Bending Strength in Longitudinal Direction (JISZ-2113) | 300 kg/cm$^2$ | 400 kg/cm$^2$ | 350 kg/cm$^2$ |
| Bending Elastic Modulus (JISZ-2113) | 2.0 × 10$^4$ kg/cm$^2$ | 3.5 × 10$^4$ kg/cm$^2$ | 3 × 10$^4$ kg/cm$^2$ |
| Bending Strength in Transverse Direction (JISZ-2113) | 250 kg/cm$^2$ | 350 kg/cm$^2$ | 20 kg/cm$^2$ |
| Compression Strength (JISZ-2111) | 40 kg/cm$^2$ | 60 kg/cm$^2$ | 15 kg/cm$^2$ |

EXAMPLE 3

In a box-form steel mold having the inside volume 2 cm deep, 10 cm broad and 50 cm long and having two holes measuring in diameter of 0.5 mm in the upper mold part for the purpose of letting generated gas out of the mold, a continuous strand mat (a product of Asahi Fiber Glass Co., Ltd.) 0.4 mm thick having weight of 450 g/m$^2$ and cut in size of 10 cm by 50 cm was spread, and thereon ten glass rovings (in a combined thickness of 0.6 mm) cut in length of 50 cm, each of which consisted of 60 strands, each strand corresponding to a bundle of 200 single fibers 9μ thick, were arranged at regular intervals and further 200 g of foamable polyurethane was poured onto the glass rovings so as to form an evenly dispersed state.

The above-described foamable polyurethane was obtained by mixing 150 parts by weight of crude diphenylmethane diisocyanate with a liquid composition consisting of 100 parts by weight of polyether polyol having 4 hydroxy groups obtained by an addition reaction of propylene oxide, 1.5 parts by weight of distilled water, 5 parts by weight of monofluoro-trichloromethane, 0.5 part by weight of silicone oil and 0.3 part by weight of dibutyl tin dilaurate.

Next, a paper honeycomb (Hatocore, manufactured by Honshu Paper Co., Ltd.) having the thickness of 18 mm and cut in size of 10 cm by 50 cm was placed on the foamable polyurethane and thereon the same number of glass rovings as described above were arranged and further the same continuous strand mat as described above was put on the glass rovings. Thereafter, the mold was closed.

After the foaming of the resinous liquid in the mold was almost completed, the mold was placed in a heating oven, and the foamed resin therein was heated at a temperature of 120° C. for 10 minutes. Then, the mold was removed from the oven and chilled with water. Thereafter, the resulting molding was removed from the mold.

Thus, a foamed resin article the surfaces of which were constructed of foamed polyurethanes reinforced by fibers (53.8% by volume), as shown in FIG. 2, was obtained. The article obtained had the following physical properties:

| | |
| --- | --- |
| Specific Gravity (measured by the method described in JISZ-2102) | 0.36 |
| Bending Strength (in the longitudinal direction measured by the method described in JISZ-2113) | 450 kg/cm$^2$ |
| Bending Elastic Modulus (in the longitudinal direction measured by the method described in JISZ-2113) | 3.8 × 10$^4$ kg/cm$^2$ |
| Compression Strength (measured by the method described in JISZ-2111) | 40 kg/cm$^2$ |

EXAMPLE 4

A plate-like shaped foamed resin article was prepared in the same manner as in Example 3 except that instead of 200 g of the foamable polyurethane poured into the mold was employed a liquid composition obtained by mixing a 200 g portion of a mixture consisting of 100 parts by weight of polyol (the same one as used in Example 1), 1.5 parts by weight of distilled water, 10 parts by weight of monofluoro-trichloromethane, 0.5 part by weight of silicone oil, 0.3 part by weight of dibutyl tin laurate and 150 parts by weight of purified diphenylmethane diisocyanate with 75 g of aggregate (foamed article of glass-clay system which contains as main component glass grains having granularity of 2.5 to 5 mm and apparent specific gravity of 0.59, trade name OK Raito, manufactured by Chichibu Concrete Industry Co., Ltd.).

The article obtained had the following physical properties, each of which was measured by the same method as described in Example 3:

| Specific Gravity | 0.375 |
| --- | --- |
| Bending Strength in the Longitudinal Direction | 450 kg/cm$^2$ |
| Bending Elastic Modulus | 4.1 × 10$^4$ kg/cm$^2$ |
| Compression Strength | 60 kg/cm$^2$ |

EXAMPLE 5

According to the procedures in FIG. 4, foamed resin structural materials were produced. A continuous strand mat (manufactured by Asahi Fiber Glass Co., Ltd.) having a weight of 540 g/m$^2$ and 85 volume % voids was used as a fiber mat, and a honeycomb paper (Diacell, manufactured by Shin-Nippon Core Co., Ltd.) having a thickness of 18 mm, a width of 170 mm, a thickness of the kraft paper constructing the honeycomb paper of 0.3 mm, 95 volume % voids and an apparent specific gravity of 0.022, and constructed of hexagonal cores having a side of 12 mm was used as a honeycomb material.

The same foamable polyurethane used in Example 1 was poured into the voids of the honeycomb material in an amount of 800 g/min. and then the three layers were passed through a molding passage 6 of 9 m length constructed by four endless belts made of stainless steel to form a space of a 170 mm width and a 20 mm height. After being heated at 120° C. by a heater covering about 3 m of the middle part of the molding passage 6, the article was removed from the passage by an endless belt at a speed of 1 m/min. and cut by a circular saw. The article thus-obtained was 20 mm thick, 170 mm wide and 4,000 mm long and had the following physical properties measured as in Example 1.

| Specific Gravity | 0.30 |
| --- | --- |
| Bending Strength in the Longitudinal Direction | 320 kg/cm$^2$ |
| Bending Elastic Modulus | 2.0 × 10$^4$ kg/cm$^2$ |
| Bending Strength in the Traverse Direction | 220 kg/cm$^2$ |
| Compression Strength | 30 kg/cm$^2$ |

The article had a 1.0 mm thick surface layer.

EXAMPLE 6

According to the procedures of FIG. 5, foamed resin structural materials were produced. The same continuous strand mat, honeycomb material, and equipment, i.e., endless belts, and molding passage as used in Example 5, and the same foamable polyurethane as used in Example 3 were used.

The glass-roving used was a combination of 60 strands, each strand being a multiplicity of 2,000 single glass fibers having a thickness of 9μ. 18 glass rovings were spread on the honeycomb material and the resinous liquid was poured thereon in an amount of 480 g/min.

The article thus-obtained was 20 mm thick, a 170 mm wide and a 4,000 mm long, and the layer of foamed resin reinforced by the mat was 0.4 mm thick and the layer of foamed resin reinforced by the glass rovings was 0.6 mm thick.

The physical properties of the article are as follows.

| Specific Gravity | 0.30 |
| --- | --- |
| Bending Strength in the Longitudinal Direction | 450 kg/cm$^2$ |
| Bending Elastic Modulus | 4.0 × 10$^4$ kg/cm$^2$ |
| Compression Strength | 30 kg/cm$^2$ |

While the invention has been described in detail and with reference to specific embodiments thereof, it will be apparent to one skilled in the art that various changes and modifications can be made therein without departing from the spirit and scope thereof.

What is claimed is:

1. A process for preparing a foamed resin structural material which comprises placing a core material having a honeycomb structure between two or more layers of fiber materials, supplying a foamable thermosetting resinous liquid to the voids of the honeycomb structure, introducing the resulting laminate into a passage for molding and heating said previously supplied foamable thermosetting resinous liquid in said passage to cause said resinous liquid to foam and thereby fill the voids of said honeycomb structure and at the same time permeate and cover said fiber materials, wherein said method comprises feeding said core material to said passage for molding from an elevated position wherein said core material is fed to said passage for molding in a descending manner and so that the angle of descent is decreased as said core material advances toward said passage for molding, and applying said thermosetting resinous liquid from a resinous liquid-injecting apparatus situated above to the voids of the honeycomb structure such that said resinous liquid flows down the honeycomb structure toward the passage for molding, while the honeycomb structure is elevated from the passage for molding and does not come entirely into contact with the passage for molding.

2. The process of claim 1, wherein the passage for molding comprises endless belts, one of which forms the lower surface of said passage, and is arranged so as to extend beyond the inlet of said passage, and the fiber material forming the lower surface of said foamed resin structural material is fed along said endless belt forming the lower surface.

3. The process of claim 1, wherein said passage for molding is constructed of a first endless belt forming the upper surface or ceiling of said passage and a second belt forming the lower surface or floor of said passage.

4. The process of claim 3, wherein said second belt forming said floor extends beyond the inlet of said passage for molding and thereby provides a convenient location for placing said core material prior to foaming.

5. The process of claim 1, wherein said honeycomb structure is placed between two pairs of layers of fiber materials, an outermost layer of a highly impregnatable fiber mat and an inner layer of a plurality of long fibers.

6. The process of claim 5, wherein said fiber mat is a continuous strand mat.

7. The process of claim 1, wherein said fiber materials are glass.

8. The process of claim 5, wherein said long fibers are glass roving.

9. The process of claim 1, wherein said resinous liquid is a thermosetting resin selected from the group consisting of polyurethane, phenolic resins, unsaturated polyester resins, urea resins, melamine resins and epoxy resins.

10. The process of claim 1, wherein said passage for molding is equipped with a means to cool the product.

11. The process of claim 9, wherein said resinous liquid is a thermosetting polyurethane.

* * * * *